United States Patent
Kobayashi et al.

(10) Patent No.: US 8,881,405 B2
(45) Date of Patent: *Nov. 11, 2014

(54) WHEEL SUPPORT HUB UNIT, BEARING RING MEMBER FOR WHEEL SUPPORT HUB UNIT, AND METHOD OF MANUFACTURING THE SAME

(71) Applicants: Kazuto Kobayashi, Fujisawa (JP); Kiyoshi Ootuka, Fujisawa (JP); Yuu Yasuda, Fujisawa (JP)

(72) Inventors: Kazuto Kobayashi, Fujisawa (JP); Kiyoshi Ootuka, Fujisawa (JP); Yuu Yasuda, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,263

(22) Filed: Feb. 26, 2013

(65) Prior Publication Data

US 2013/0167611 A1 Jul. 4, 2013

Related U.S. Application Data

(63) Continuation of application No. 11/239,314, filed on Sep. 30, 2005, now Pat. No. 8,402,661.

(30) Foreign Application Priority Data

| Oct. 13, 2004 | (JP) | ................... 2004-298585 |
| Nov. 19, 2004 | (JP) | ................... 2004-335534 |

(51) Int. Cl.
| *B21D 53/10* | (2006.01) |
| *B60B 27/00* | (2006.01) |
| *F16C 19/18* | (2006.01) |
| *F16C 33/64* | (2006.01) |
| *B21K 1/40* | (2006.01) |
| *B21J 5/02* | (2006.01) |

(52) U.S. Cl.
CPC ............... *B21J 5/02* (2013.01); *B60B 27/0005* (2013.01); *B60B 27/00* (2013.01); *F16C 19/186* (2013.01); *B60B 27/0084* (2013.01); *F16C 2326/02* (2013.01); *B60B 27/0094* (2013.01); *F16C 33/64* (2013.01); *B21K 1/40* (2013.01)
USPC ..................... 29/898.066; 29/894.36; 384/544

(58) Field of Classification Search
USPC ............. 29/898.066, 898.07, 898.09, 894.36, 29/894.362; 384/544, 448, 488; 74/537
See application file for complete search history.

(56) References Cited

U.S. PATENT DOCUMENTS

| 3,749,416 A | 7/1973 | Asberg |
| 6,772,615 B2 | 8/2004 | Hagiwara et al. |

(Continued)

FOREIGN PATENT DOCUMENTS

| CN | 1104131 A | 6/1995 |
| CN | 1447883 A | 10/2003 |

(Continued)

OTHER PUBLICATIONS

Japanese Patent Office Action issued in application No. JP2004-298585 dated Jan. 5, 2010.

(Continued)

*Primary Examiner* — Ryan J Walters
(74) *Attorney, Agent, or Firm* — Sughrue Mion, PLLC

(57) ABSTRACT

A raceway member (6) of a wheel support hub unit, having wheel or vehicle body fixing portions (7) extending radially outward from a solid or hollow shaft portion, and a wheel or vehicle body positioning cylindrical portion (9) extending concentrically with the shaft portion, the fixing portion (7) being formed by the cold side extrusion so that the fixing portion is integral with the shaft portion (5).

7 Claims, 17 Drawing Sheets

(56) References Cited

U.S. PATENT DOCUMENTS

| | | |
|---|---|---|
| 7,465,102 B2 | 12/2008 | Niebling et al. |
| 7,470,067 B2 | 12/2008 | Meeker et al. |
| 2003/0165280 A1 | 9/2003 | Hofmann et al. |

FOREIGN PATENT DOCUMENTS

| | | |
|---|---|---|
| DE | 2233966 A1 | 1/1974 |
| DE | 2242531 A1 | 3/1974 |
| DE | 10331180 A1 | 2/2005 |
| EP | 0356589 A | 3/1990 |
| EP | 1431071 A | 6/2004 |
| JP | 4425467 B | 10/1969 |
| JP | 61195726 A | 8/1986 |
| JP | 02299739 A | 12/1990 |
| JP | 10118738 A | 5/1998 |
| JP | 2003025803 A | 1/2003 |
| JP | 2003291604 A | 10/2003 |
| JP | 2004074815 A | 3/2004 |
| JP | 2004203209 A | 7/2004 |

OTHER PUBLICATIONS

Extended European Search Report dated Oct. 27, 2008.
Cheng ("The Closed Cold Forging Process for the Starlike Casing and Design of the Die", 2003).

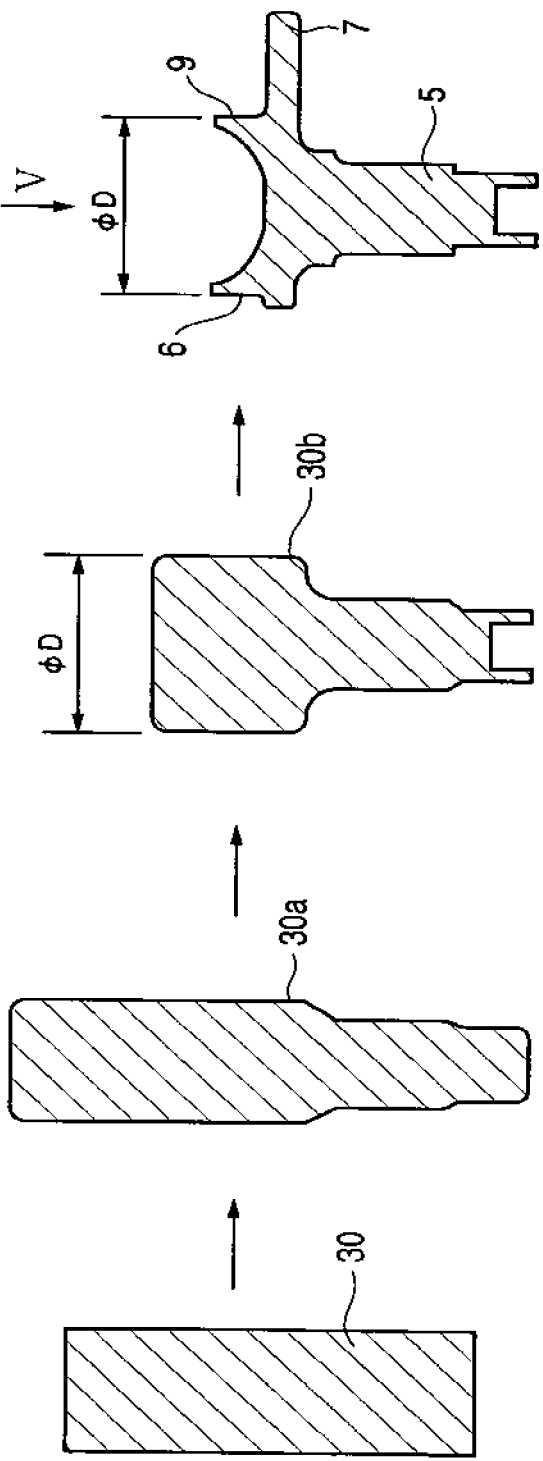

FORMATION OF STEPPED PORTIONS

SIDEWAY EXTRUSION

RAW MATERIAL

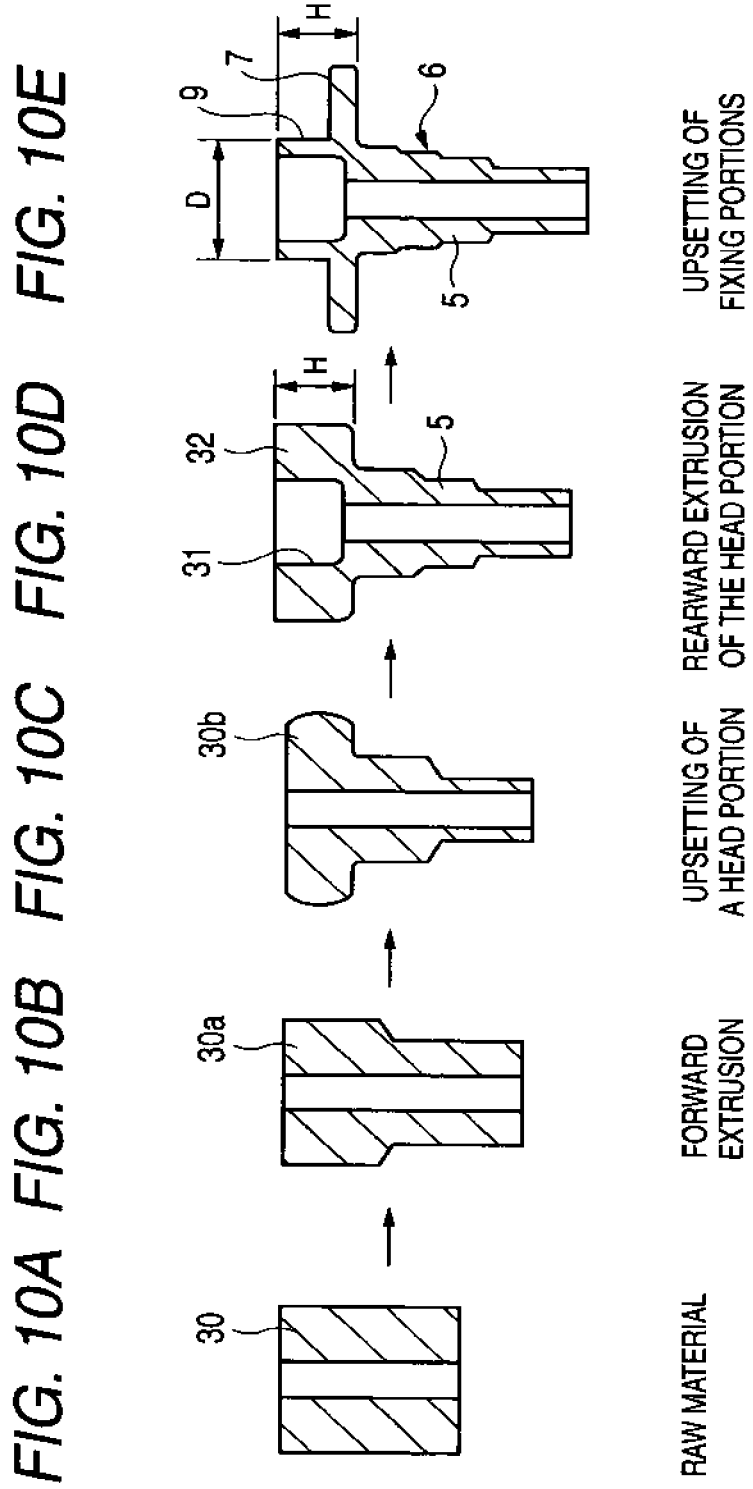

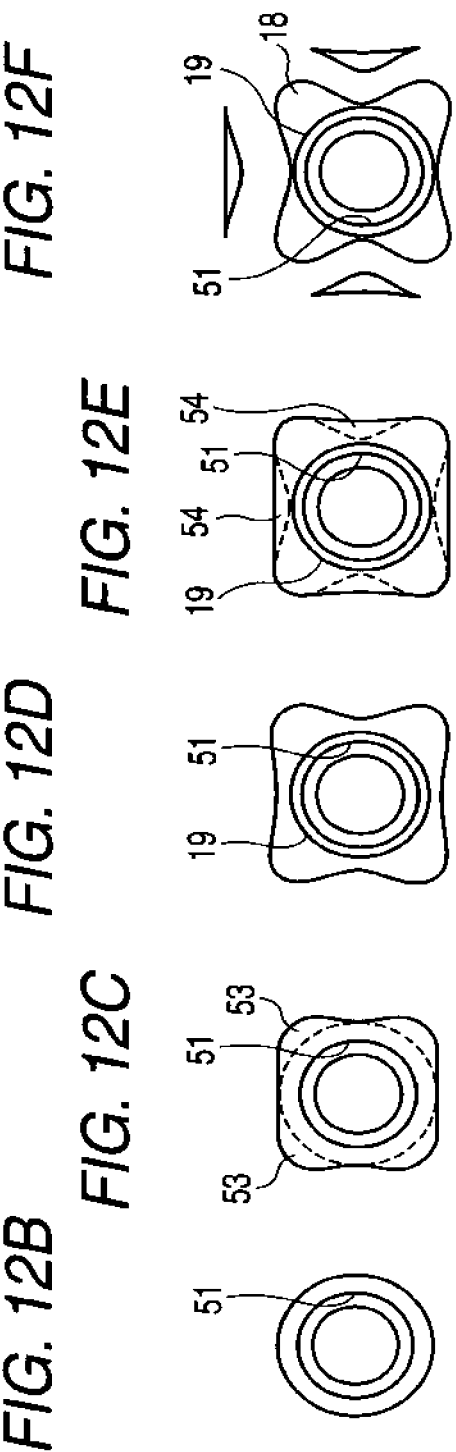

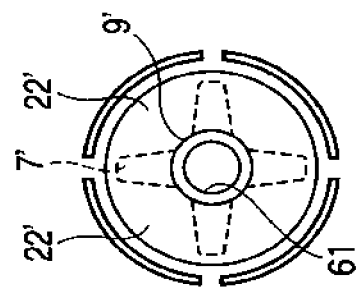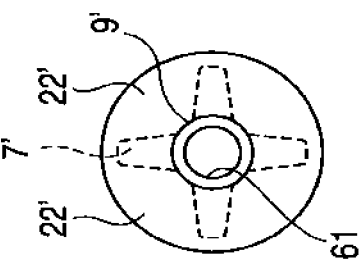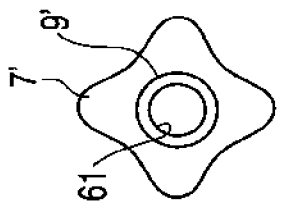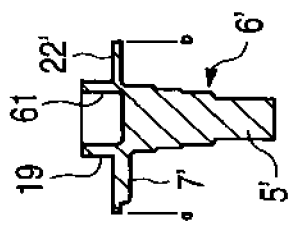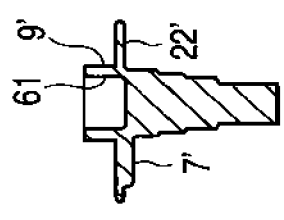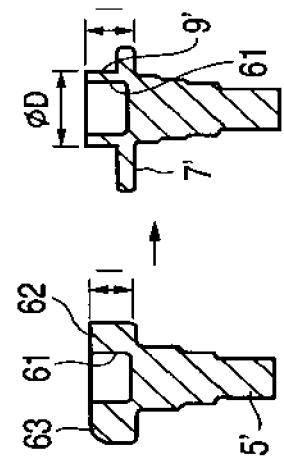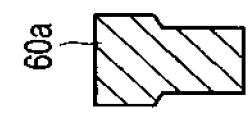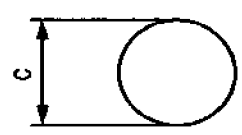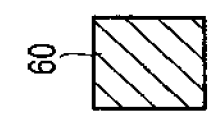
FIG. 13A  FIG. 13B  FIG. 13C  FIG. 13D  FIG. 13E  FIG. 13F  FIG. 13G
RAW MATERIAL → FORWARD EXTRUSION → UPSETTING OF A HEAD PORTION → REARWARD EXTRUSION OF THE HEAD PORTION → UPSETTING OF FIXING PORTIONS → FORMATION STEPPED PORTIONS ON THE FIXING PORTIONS → TRIMMING

HOT FORGING

WHEEL SUPPORT HUB UNIT, BEARING RING MEMBER FOR WHEEL SUPPORT HUB UNIT, AND METHOD OF MANUFACTURING THE SAME

CROSS-REFERENCE TO RELATED APPLICATION

This is a continuation of application Ser. No. 11/239,314, filed Sep. 30, 2005, which claims priority from Japanese Patent Application Nos. 2004-335534, filed Nov. 19, 2004, and 2004-298585, filed Oct. 13, 2004, which applications are incorporated herein in their entirety by reference.

BACKGROUND OF THE INVENTION

The present invention relates to a wheel support hub unit adapted to support rotatably a wheel of, for example, an automobile on a suspension unit, a bearing ring member for a wheel support hub unit, and a method of manufacturing the same.

A wheel of an automobile and the like is supported rotatably on a wheel support hub unit fixed to a suspension unit for a vehicle body. The wheel support hub unit is provided with a plurality of rolling elements interposed between an inner member and an outer member, which have raceway surfaces, the inner member and outer member being provided with fixing flanges to be fixed to the suspension unit for the wheel or vehicle body. A positioning unit adapted to position the wheel is provided on a side of the fixing flanges.

When the inner member and outer member as bearing ring members are manufactured, the surface area of the fixing flanges is large, and a very large forming load is needed in the cold forging process, so that the hot forging process is generally carried out. However, in the hot forging process, the dimensional accuracy is low, and a decarbonization removal operation is necessary in some cases in a thermal treatment unit. Since a large cutting margin is necessary in a later process, the manufacturing cost increases.

Under the circumstances, a related art bearing ring member manufacturing method in which fixing flanges are cut and raised from an intermediate raw material formed by cold forging a cylindrical pipe as a base material with the portions left after the cutting and raising operations used as positioning portions (refer to, for example, the Patent Document 1), and a related art bearing ring member manufacturing method in which positioning portions are formed separately from the bearing ring member and fixed to the bearing ring member (refer to, for example, to the Patent Document 2) are proposed.

A hub ring 6' shown in FIG. 14 and an outer ring 3 shown in FIG. 15 are known as a bearing ring member constituting the inner member and outer member in which consideration is given to the reduction of the weight thereof and the retention of the strength thereof. The hub ring 6' is provided with a solid shaft portion 5' and radial wheel fixing flanges 7' extending in the direction crossing the shaft portion 5' at right angles thereof. In the wheel fixing flanges 7', a plurality of fixing portions 21' are formed to a large thickness, and, among the fixing portions 21', web-shaped small-thickness portions 22' are formed. The outer ring 3 is provided with a hollow shaft portion 15, and a suspension unit fixing flanges 18 extending in the direction crossing the shaft portion 15 at right angles thereto, the suspension unit fixing flanges 18 being made heteromorphous at an outer circumferential portion thereof.

These bearing ring members are made by related art methods as shown in FIG. 16, by forming small-thickness portions 22' by expanding the excess parts among the fixing sections 21' of the wheel fixing flanges 7' by a hot forging operation, and then cutting off unnecessary parts 23 by subjecting the small-thickness portions 22' to a trimming process as shown in FIG. 17.

[Patent Document 1] JP-A-2003-25803
[Patent Document 2] JP-A-2003-291604
[Patent Document 3] JP-A-2004-74815

However, in the invention disclosed in the above Patent Publication 1, a bending process is carried out when a joint portion between the fixing flanges, which need the highest strength, and the outer circumferential portion of the bearing ring member is cut and raised, flaws, such as cracks being liable to occur, the strength of the joint portion becoming unstable. Moreover, since the joint portion has to be rendered easily bendable, it is impossible to reinforce this portion by, for example, increase the thickness thereof and the like. Since the positioning portion is not formed to a circumferentially continuous cylindrical shape, the positioning operation becomes unstable. The strength of the joint portion is not sufficiently high, either.

In the patent disclosed in the above Patent Document 2 and that disclosed in the Patent Document 3, the positioning portion is formed separately from the bearing ring member, so that the positional accuracy and a degree of right angle of the positioning portion and raceway surface on the side of the bearing ring member is liable to lower. Moreover, the number of parts increases to cause the manufacturing cost to be heightened. Furthermore, since a bearing ring member including fixing flanges cannot be cold formed, a cutting margin in a later step is large, so that the manufacturing cost increases.

The bearing ring members shown in FIGS. 14A and 14B and FIGS. 15A and 15B are manufactured by the hot forging, the above-mentioned problems are included. Such parts of the bearing ring members that are pressed to a small thickness extend greatly toward the outer circumferential side thereof, so that the quantity of excess thickness becomes large to cause the yield to lower. Moreover, since the excess thickness is large, the surface area of the upset portion increase, and the forming load increases. For these reasons, it becomes disadvantageous in particular to form such a heteromorphous flanges by the cold forging in which the stress becomes high.

SUMMARY OF THE INVENTION

The present invention is made so as to eliminate such inconveniences, and an object of the invention is to provide an inexpensive wheel support hub unit, a bearing ring member of the wheel support hub unit, and a method of manufacturing the same, capable of forming a positioning member into a circumferentially continuous cylindrical integral member, and forming fixing flanges to small weight by the cold forging without carrying out a process, such as a bending process.

These objects can be achieved by the following structures.
(1) A bearing ring member of a wheel support hub unit including:

wheel or vehicle body fixing portions extending radially outward from a solid or hollow shaft portion, and a wheel or vehicle body positioning cylinder provided concentrically with the shaft portion, wherein the fixing portions are formed by the cold side extrusion so that the fixing portions are integral with the shaft portion.

(2) The wheel support hub unit including:
an inner member,
an outer member, and
a bearing unit having at least rolling elements between the inner member and outer member, wherein
at least one of the inner member and outer member is identical with the bearing ring member defined in Claim 1.

(3) A method of manufacturing a bearing ring member of a wheel support hub unit including wheel or vehicle body fixing portions extending radially outward from a solid or hollow shaft portion, a wheel or vehicle body positioning cylinder provided concentrically with the shaft portion,
the method including the steps of:
a placing step for placing a raw material, which is formed to a predetermined shape in advance, for the shaft portion in a die having grooves extending radially outward,
a pressing step for pressing at normal temperature the parts of the raw material for the shaft portion which correspond to one or both end sections of the shaft portion,
a flowing step for making the raw material for the shaft portion flow in the grooves of the die,
so that the fixing portions with the shaft portion in one body by the side extrusion is formed.

(4) A method of manufacturing a bearing ring member of a wheel support hub unit, including a solid or hollow shaft portion, wheel or vehicle body fixing portions extending from the shaft portion in the radially outward direction, and a wheel or vehicle body positioning cylindrical portion provided on the opposite side of the shaft portion with the fixing portions held therebetween, and concentrically with the shaft portion,
the method is carried out by a cold forging operation including:
an extrusion step for extrusion forming a solid or hollow shaft portion raw material into a head portion provided with a shape identical with the shape of the inner circumference of the shaft portion and positioning cylindrical portion, and
a upsetting step for forming the fixing portions by upsetting the head portion by using a die, which has a bore which corresponds to an outer circumference of the positioning cylindrical portion, with the height of the fixing portions left on the head portion.

(5) The method of manufacturing a bearing ring member of a wheel support hub unit according to (4), further including:
a heteromorphous forming step for forming the head portion, which is formed to a heteromorphous outer circumferential shape having radial projections the number of which is equal to the number of fixing holes made in the fixing portions, by restraining the head portion by the heteromorphous die and upsetting the same after the extrusion step is carried out, wherein
the upsetting step is carried out without restraining the outer circumference of the fixing portions with the height of the fixing portions left on the head portion, by using the die, to form the fixing portions having a heteromorphous outer circumference.

(6) The method of manufacturing a bearing ring member of a wheel support hub unit according to (4), wherein
the extrusion step is carried out to form at the same time the head portion to a heteromorphous outer circumferential shape having radial projections the number of which is equal to the number of the fixing holes provided in the fixing portions,
the upsetting step is carried out without restraining the outer circumference of the fixing portions with the height of the fixing portions left on the head portion, by using the die, to form the fixing portions having a heteromorphous outer circumference.

(7) The method of manufacturing a bearing ring member of the wheel support hub unit according to (5) or (6), further including:
a thinning step carried out after the upsetting step, for upsetting the parts of the fixing portions which are between the circumferentially adjacent radial projections to a smaller thickness.

(8) The bearing ring member of a wheel support hub unit manufactured by any of the methods defined in (4) to (7), wherein
the bearing ring member includes:
a solid or hollow shaft portion,
wheel or vehicle body fixing portions extending radially outward from the shaft portion, and
a wheel or vehicle body positioning cylindrical portion provided concentrically with and on the opposite side of the shaft portion with the fixing portions held therebetween.

(9) The wheel support hub unit including:
an inner member,
an outer member, and
a bearing portion provided between the inner member and outer member and having at least rolling elements, wherein
at least one member out of the inner member and outer member is the bearing ring member defined in (8).

According to the present invention, the fixing portions are formed with the shaft portion in one body by the cold side extrusion. Therefore, even when the extrusion length, i.e. the area of the fixing portions increases, the forming load does not vary, and the forming operation can be carried out with a small load as compared with the case where the fixing portions are compression formed. This enables the forming operation to be carried out by using comparatively small equipment by the cold forging, a cutting margin occurring in the later stage to be reduced, and the inexpensive bearing ring member and wheel support hub unit to be obtained. Furthermore, a joint portion between the fixing portions and an outer circumferential portion of the bearing ring member is not subjected to a bending process, so that a sufficient thickness can be secured in the joint portion. This enables the bearing member and wheel support hub unit having a sufficient strength to be obtained.

Since the fixing portions are formed by the sideway extrusion, the extrusion remaining portion can be used as the positioning cylindrical portion. Therefore, the circumferentially continuous positioning cylindrical portions can be formed easily and highly accurately with the shaft portion in one body. When the positioning cylindrical portion is formed separately, a required fixing excess thickness becomes unnecessary, and a material yield in the condition in which the thickness of the required portion is secured can be improved. This enables the manufacturing cost to be reduced.

According to the present invention, the bearing ring member is formed by the cold forging including a step of extrusion forming out of a solid or hollow shaft raw material a shaft portion and a head portion having a shape of an inner circumference of a positioning cylindrical object, and a upsetting step for forming fixing portion by upsetting the head portion with the height of the fixing portions kept thereon, by using a die provided with a bore the diameter of which corresponds to that of an outer circumference of the positioning cylindrical portion. Therefore, when the upset-forming of the fixing portions during which the highest processing load is imparted is done, the part of the positioning cylindrical portion which is on the inner side of the outer circumference thereof does not need to be compressed. This enables the fixing portions to be formed with a lower upsetting surface and lower load as compared with those in the case where the material as a whole is upset.

Owing to these operations, the fixing portions can be formed by the cold forging using comparatively small equipment. Therefore, a cutting processing margin used in a later process can be reduced, and an inexpensive bearing ring member and a wheel support hub unit can be obtained. Since a joint portion between the fixing portions and the outer circumferential portion of the bearing ring member is not subjected to a bending process, a sufficient thickness of the joint portion can be secured, and a bearing ring member and a wheel support hub unit which have a sufficient strength can be obtained.

Since the inner circumferential side portion of the raw material can be formed as a positioning cylindrical portion during the upsetting process, the circumferentially continuous positioning cylindrical portion can be formed so as to be integral with the shaft portion accurately with ease. Moreover, when the positioning cylindrical portion is formed separately, the excess thickness needed for the fixing operation in the above-described case becomes unnecessary, so that the material yield can be improved with the thickness of the necessary portion secured. This enables the manufacturing cost to decrease.

The outer circumferential shape of the head portion not yet subjected to the upsetting step is set to a heteromorphous shape, the surface area of the upset portion during a upsetting process decreases, so that the forming load can be held down to a low level. When the small thickness portion only is upset, the outer circumference of the upset portion can be reduced, so that the forming load can be reduced to a low level. Moreover, the quantity of the portion to, be trimmed of the outer circumference decreases, so that the yield can be improved.

BRIEF DESCRIPTION OF THE DRAWINGS

FIGS. 2A and 2B are drawings for describing the hub ring as a raceway member of the wheel support hub unit, wherein FIG. 2A is a side view thereof, and FIG. 2B a sectional view taken along the line II-II in FIG. 2A.

FIG. 3 is a drawing for describing the outer ring as the raceway member of the wheel support hub unit, wherein

FIGS. 4A thru 4D are drawings for describing a process for manufacturing the hub ring.

FIGS. 10A thru 10E are process drawings for describing the method of manufacturing the bearing ring member of the wheel support hub unit in the second embodiment of the present invention.

FIGS. 12A thru 12F are process drawings for describing the method of manufacturing the bearing ring member of the wheel support hub unit in the third embodiment of the present invention.

FIGS. 13A thru 13G are process drawings for describing the method of manufacturing the bearing ring member of the wheel support hub unit in the forth embodiment of the present invention.

FIGS. 14A and 14B are drawings showing a bearing ring member having small-thickness portions among the fixing flanges, wherein FIG. 14A is a drawing taken in the axial direction, and FIG. 14B a sectional view taken along the line VI-VI in FIG. 14A.

FIGS. 15A and 15B are drawings showing a bearing ring member having heteromorphous fixing flanges, wherein FIG. 15A is a drawing taken in the axial direction, and FIG. 15B a sectional view taken along the line VII-VII in FIG. 15A.

FIGS. 16A and 16B are drawings for describing a related art method of manufacturing the bearing ring member shown in FIG. 14, wherein FIG. 16A is a drawing taken in the axial direction, and FIG. 16B a sectional view taken along the line VIII-VIII in FIG. 16A.

FIGS. 17A and 17B are drawings showing the removing of an excess thickness portion of the fixing flanges of the bearing ring member of FIG. 16 by a trimming process, wherein FIG. 17A is a drawing taken in the axial direction, and FIG. 17B a sectional view taken along the line IX-IX in FIG. 17A.

DETAILED DESCRIPTION OF THE PREFERRED EMBODIMENTS

An embodiment of the wheel support hub unit according to the present invention will now be described in detail with reference to the drawings.

First Embodiment

Figure 1:
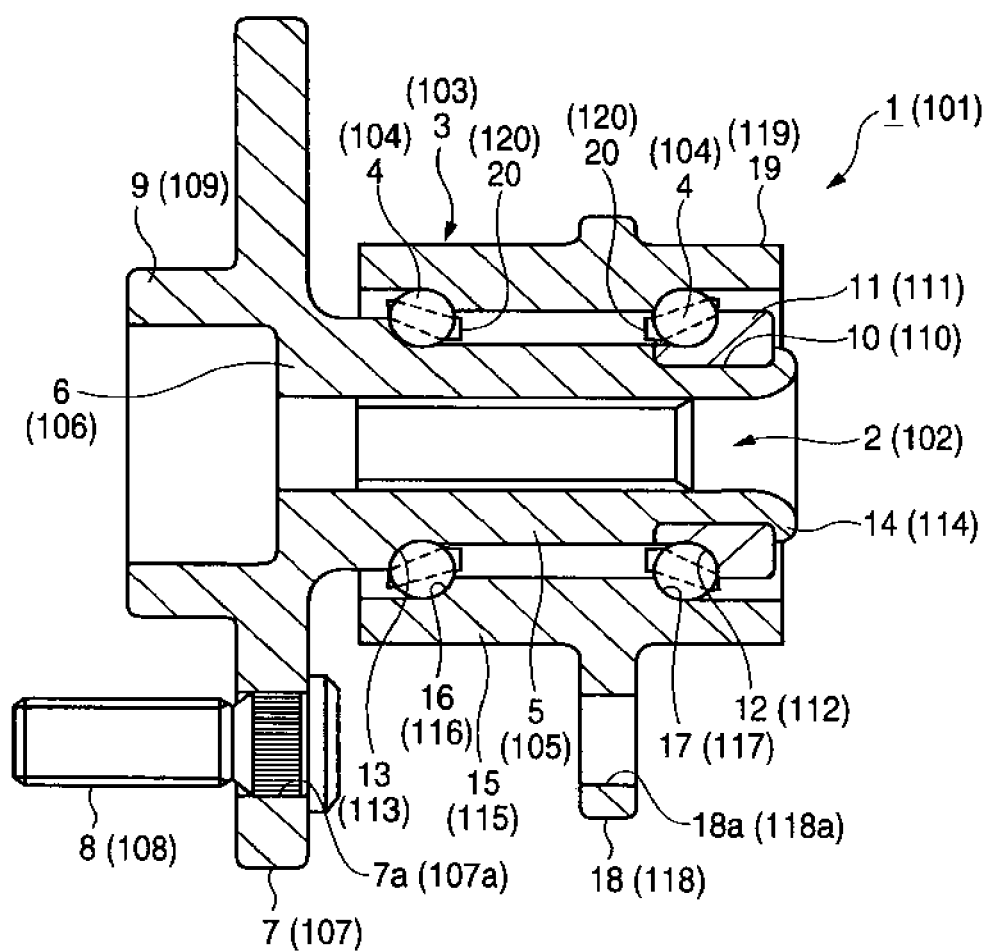
FIG. 1 is a sectional view showing one example of a wheel support hub unit according to the present invention.
Figure 2A:
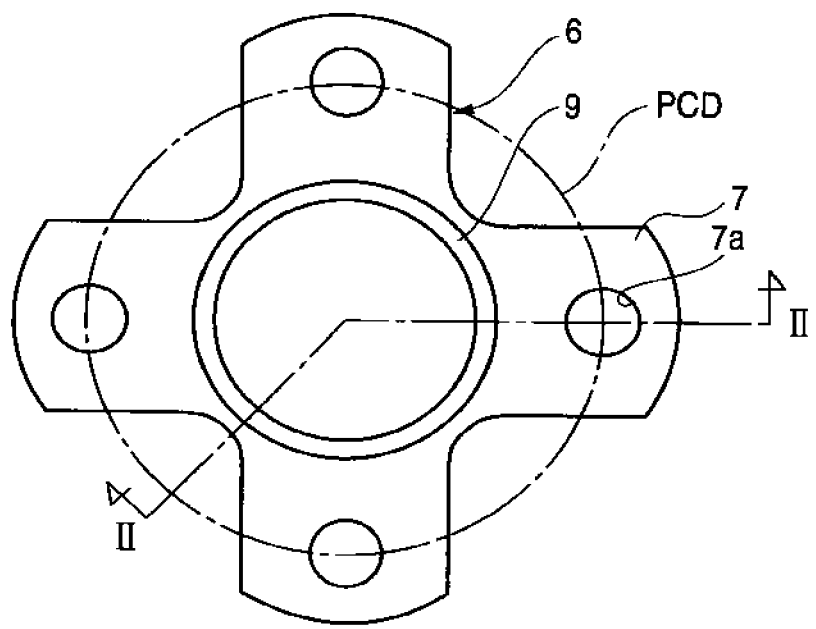
Figure 2B:
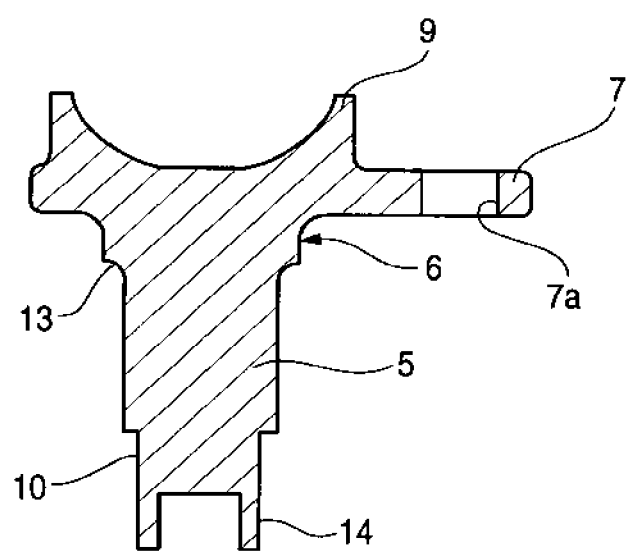
Figure 3A:
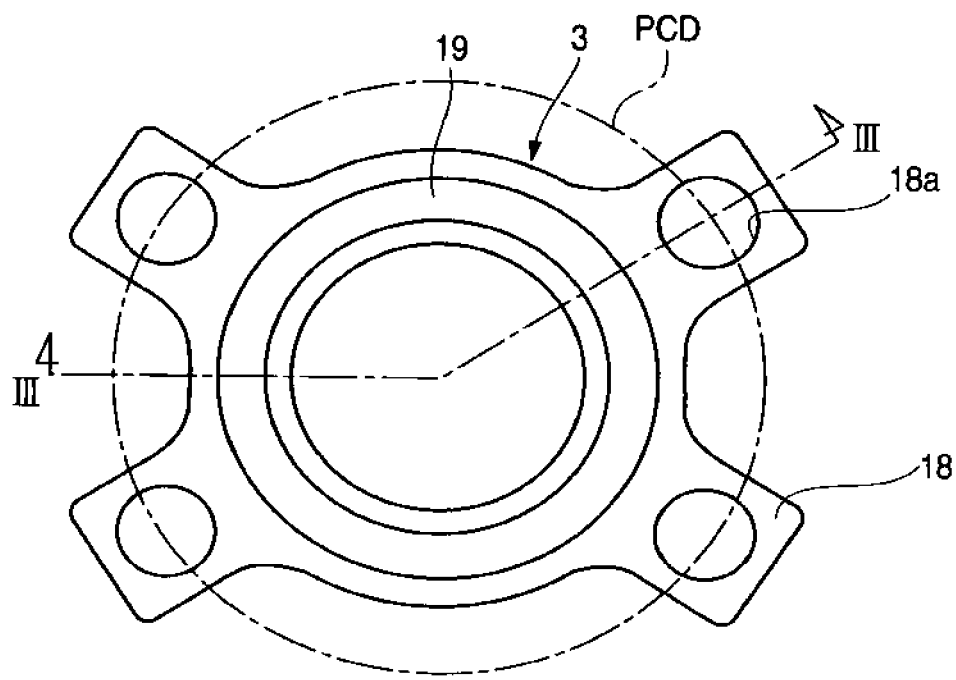
FIG. 3A is a side view thereof, and FIG. 3B a sectional view taken along the line III-III in FIG. 3A.
Figure 3B:
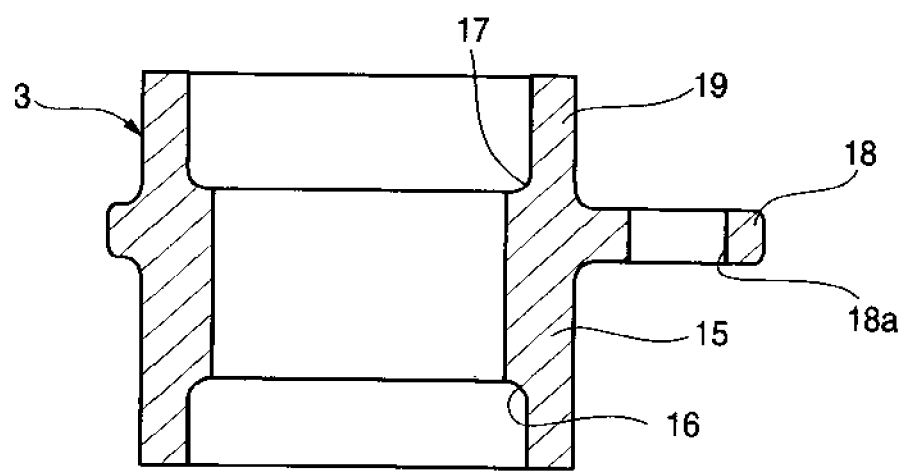

As shown in FIGS. 1 to 3, a wheel support hub unit 1 is used as a driven wheel, and provided with a bearing unit having a hub (inner member) 2, an outer ring (outer member) 3 as a bearing ring member, and a plurality of rolling elements 4.

The hub 2 is provided with a hub wheel 6 including a solid shaft portion 5 as a bearing ring member. The hub wheel 6 is provided at an outboard-side end portion (outer end portion (left end portion in FIG. 1) in the widthwise direction of the vehicle in a vehicle combined state) of the outer circumferential surface thereof with wheel fixing flanges 7 constituting the fixing portions extending in the radially outward direction which crosses the shaft portion 5 at right angles thereto. The wheel fixing flanges 7 are provided on the outboard-side surface thereof with a plurality of studs 8 implanted therein at substantially equal intervals so as to fix a wheel, brake rotors and the like thereto. Each of the wheel fixing flange 7 is provided with fixing holes 7a, and formed so that the wheel fixing flanges 7 are not connected together in the positions of the pitch circles of the wheel fixing holes 7a. The hub wheel 6 is provided at the outboard side of the wheel fixing flanges 7, i.e., at the opposite side of the shaft portion 5 via the wheel fixing flanges 7 with a wheel positioning cylindrical portion 9 projecting concentrically with the shaft portion 5.

The hub wheel 6 is provided at an inboard side end portion (inside end portion in the vehicle widthwise direction in a vehicle-combined state, i.e., at the right end portion in FIG. 1) with a small-diameter stepped portion 10, in which an inner race 11 is fitted. The inner race 11 is provided on an outer circumferential side thereof with an inner raceway surface 12, and on an outer circumferential side of an axially intermediate portion of the hub wheel 6 with an inner raceway surface 13. A front end at the inboard side of the hub wheel 6 is formed cylindrically, and the cylindrical portion (portion to be calked) 14 is calk-expanded radially outward. The inner race 11 is thereby calk-fixed to the hub wheel 6. The inner race 11 can be subjected to the application of necessary pre-pressurization by a nut (not shown) fastened to the inboard side end surface of the hub wheel 6 in addition to the calk-fixing techniques.

An outer race 3 is formed so as to include a hollow shaft portion 15. The inner circumferential side of the outer race 3 is provided with an outer raceway surface 16 opposed to the inner raceway surface 13 of the hub wheel 6, and an outer raceway surface 17 opposed to an inner raceway surface 12 of the inner race 11. The end portion of the outer race 3 which is away from the wheel fixing flange 7 is provided with a plurality of suspension unit fixing flanges 18, which constitute fixing portions extending in the direction crossing the shaft portion 15 at right angles thereto in a radially outward position. Each of the suspension unit fixing flanges 18 is provided with a fixing hole 18a, and formed so that these flanges are not connected to one another in a pitch circle of these fixing holes 18a of the suspension unit fixing flanges 18. The outer ring 3 is provided at the inboard side of the suspension unit fixing flanges 18 thereof, i.e., the portion thereof which is on the opposite side of the shaft portion 15 via the suspension fixing flange 18 with a vehicle body positioning cylindrical portion 19 formed concentrically with the shaft portion 15.

A plurality of rolling elements 4 are arranged rollably in the circumferential direction via retainers 20 between a plurality of rows of inner raceway surfaces 12, 13 and a plurality of outer raceway surfaces 16, 17.

In the illustrated example, balls are used as the rolling elements 4. In the case of a wheel support hub unit which has large weight, taper rollers are used sometimes as the rolling elements 4.

In order to combine the above-described wheel support hub unit 1 with an automobile, the suspension unit fixing flanges 18 of the outer race 3 are fixed to the suspension unit, and a brake rotor and a wheel are secured to the wheel fixing flanges 7 of rotary ringside hub ring 6 via studs 8 and nuts (not shown), etc.

This enables the wheel to be supported rotatably on the suspension unit.

In the hub wheel 6, the wheel fixing flanges 7 extending in the radial direction which is at right angles to the shaft portion 5 are formed by the cold side extrusion so that these flanges 7 are integral with the shaft portion 5, and the positioning cylindrical portion 9 formed of the extrusion remaining portion occurring during the forming operation is also provided concentrically with the shaft portion 5 so that the cylindrical portion 9 is integral with the shaft portion 5. On the other hand, in the outer ring 3, the suspension unit fixing flanges 18 extending in the radial direction which is at right angles to the shaft portion 15 are formed by the cold side extrusion so that the suspension unit fixing flanges 18 are integral with the shaft portion 15, and the positioning cylindrical portion 19 formed by the extrusion remaining portion occurring during the forming operation is also provided concentrically with the shaft portion 15 so that the cylindrical portion 19 is integral with the shaft portion 15. The cold forging of the hub wheel 6 and outer race 3 will now be described.

Figure 5:
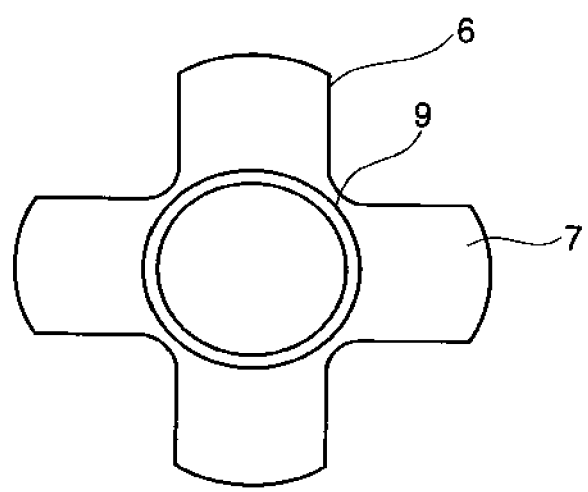
FIG. 5 is a drawing taken in the direction of an arrow V in FIG. 4D.

FIGS. 4 to 6 show an example of a process for cold forging the hub ring 6. First, a solid rod material 30 of FIG. 4A is subjected to the forward extrusion forming to thereby form a shaft-like member 30a of FIG. 4B. A head portion of the shaft-like member 30a is then pressed by heading the same to an outer diameter substantially equal to that ΦD of the positioning cylindrical portion 9. As a result, a shaft portion element 30b shown in FIG. 4C is formed. This shaft portion element 30b is further subjected to the side extrusion in the direction which is at right angles to the direction of the extrusion using a form 50 shown in FIG. 6. As a result, the hub ring 6 made integral of the wheel fixing flanges 7 and positioning cylindrical portion 9 is formed as shown in FIGS. 4D and 5. In this embodiment, a solid shaft portion element is used. When a hollow shaft portion material is used, a hub ring for the driving wheel can be formed in the same manner.

Figures 6A, 6B:
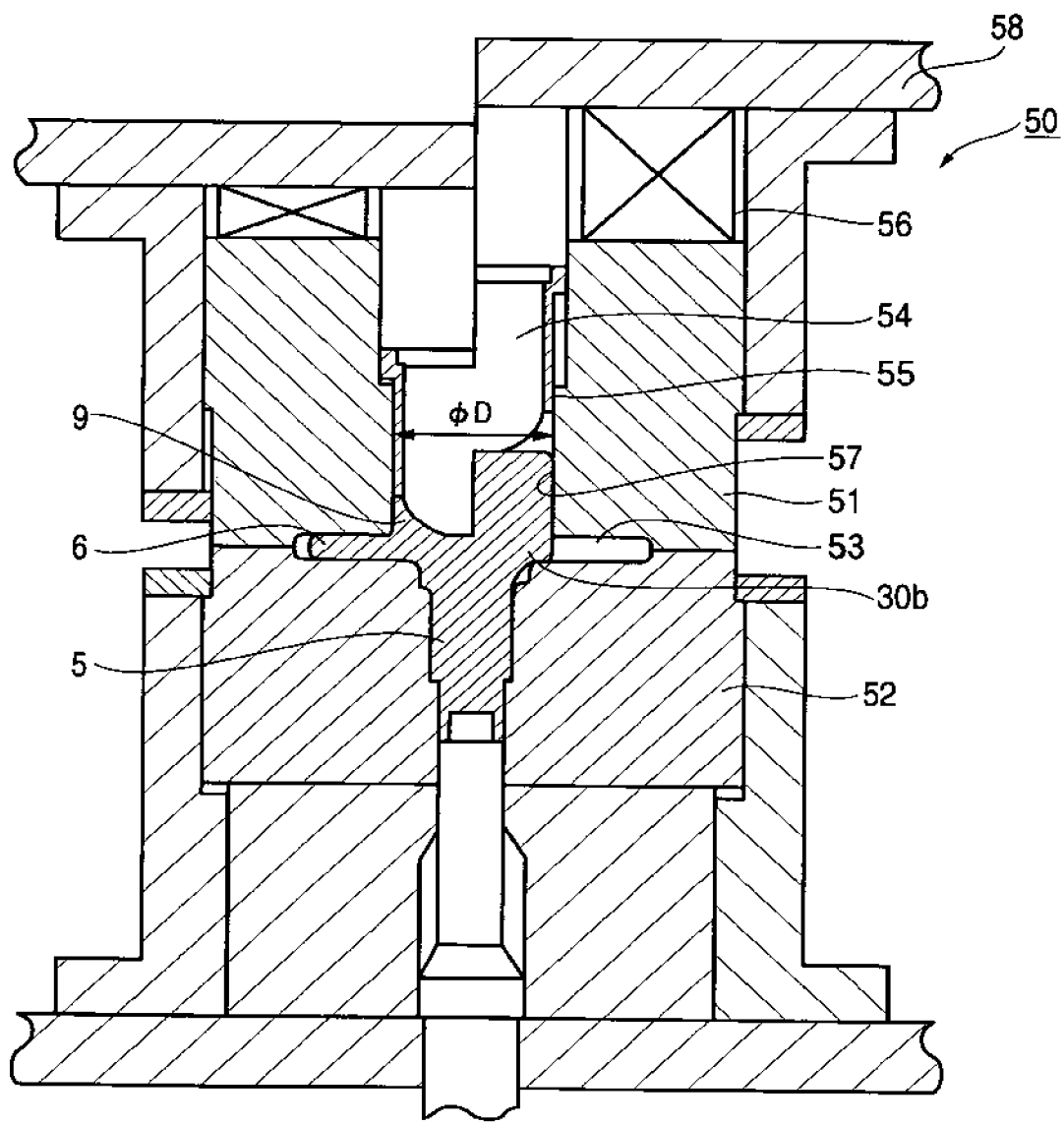
FIGS. 6A and 6B are sectional views for describing a sideway extrusion form for obtaining the hub ring.

FIG. 6 shows a form 50 used in a side extrusion process for producing the hub ring 6, and FIG. 6A the same form in a raw material inserted state, FIG. 6B showing the same form in a material forming state. This form 50 is provided with a lower die 52 into which an inboard side end section of a shaft portion material 30b is inserted, and an upper die 51 urged toward the lower die by an elastic member 56. The upper die 51 is provided with a bore 57 the diameter of which is substantially equal to the outer diameter ΦD of the positioning cylindrical portion 9, and the outboard side end section (head section) of the shaft portion raw material 30b is provided in the bore 57. The part of the interior of the bore 57 which is on the upper side of the head section is provided with a ring punch 55 and a punch 54 are so that these punches are slidable. The ring punch 55 and punch 54 are fixed to the upper form 58 to which the upper die 51 is fixed via the elastic member 56. The radial grooves 53 may be formed in the upper die 51 or the lower die 52 alone.

When the upper form 58 is then lowered, the punch 54 forms a recess in an upper surface of the head section of the shaft portion raw material 30b and compresses the same in the axial direction to cause an outer circumferential portion of the head section of the shaft portion raw material 30b to be extruded into the radial grooves in the direction (sideways) which is at right angles to the direction in which the punch advances. The wheel fixing flanges 7 are thereby formed so as to be integral with the shaft portion 5 with the extrusion remaining portion of the head section of ΦD which occurs during the forming operation becoming the positioning cylindrical portion 9.

During this time, the forming load is imparted to only the inner surface of the head section, and does not have influence on the length (surface area). Therefore, when the length (surface area) of the wheel fixing flanges 7 is large, the flanges can be formed with a very small forming load as compared with that in the case where the wheel fixing flanges 7 are compression formed.

Figure 7C:
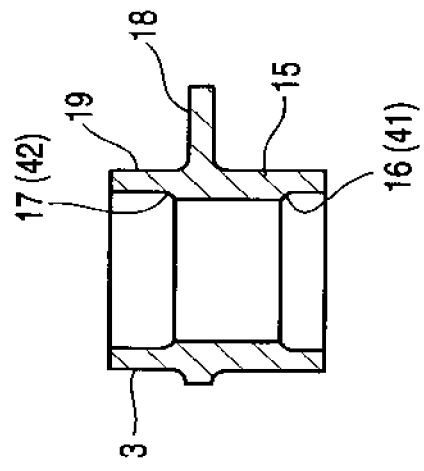
FIGS. 7A thru 7C are drawings for describing a process for manufacturing the outer ring.
Figure 7B:
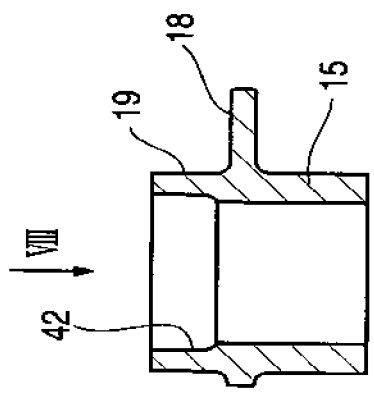
Figure 7A:
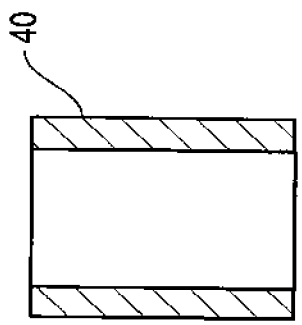
Figure 8:
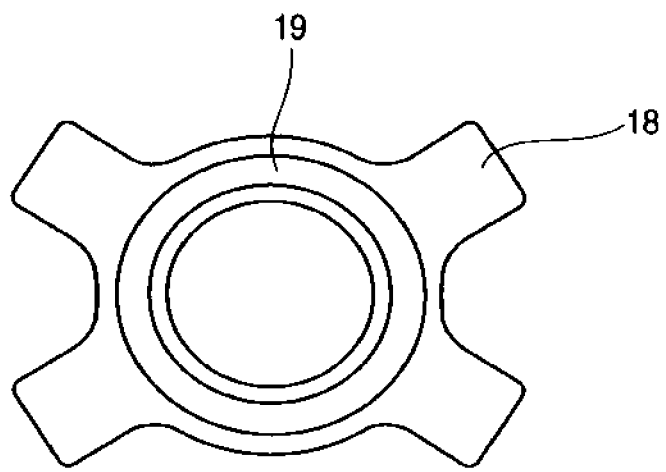
FIG. 8 is a drawing taken in the direction of an arrow VIII in FIG. 7B.

An example of a step of cold forging the outer ring 3 will now be described with reference to FIGS. 7 to 9. In this example, a hollow cylindrical shaft portion raw material 40 of FIG. 7A (this shaft portion raw material can be obtained by removing the bottom by the draw forming or by removing the bottom by the rearward extrusion forming, and the like in addition to a seam welded pipe cutting method) is subjected to the side extrusion using a form shown in FIG. 9, in the direction which is at right angles to the pushing direction to thereby form an integral combination of the suspension unit fixing flanges 18 and positioning cylindrical portion 19 as shown in FIGS. 7B and 8. A stepped portion 41 opposed to the outer ring raceway surface 16 is then formed on the end portion inner surface on the outboard side as shown in FIG. 7C to form the outer ring 3.

Figures 9A, 9B:
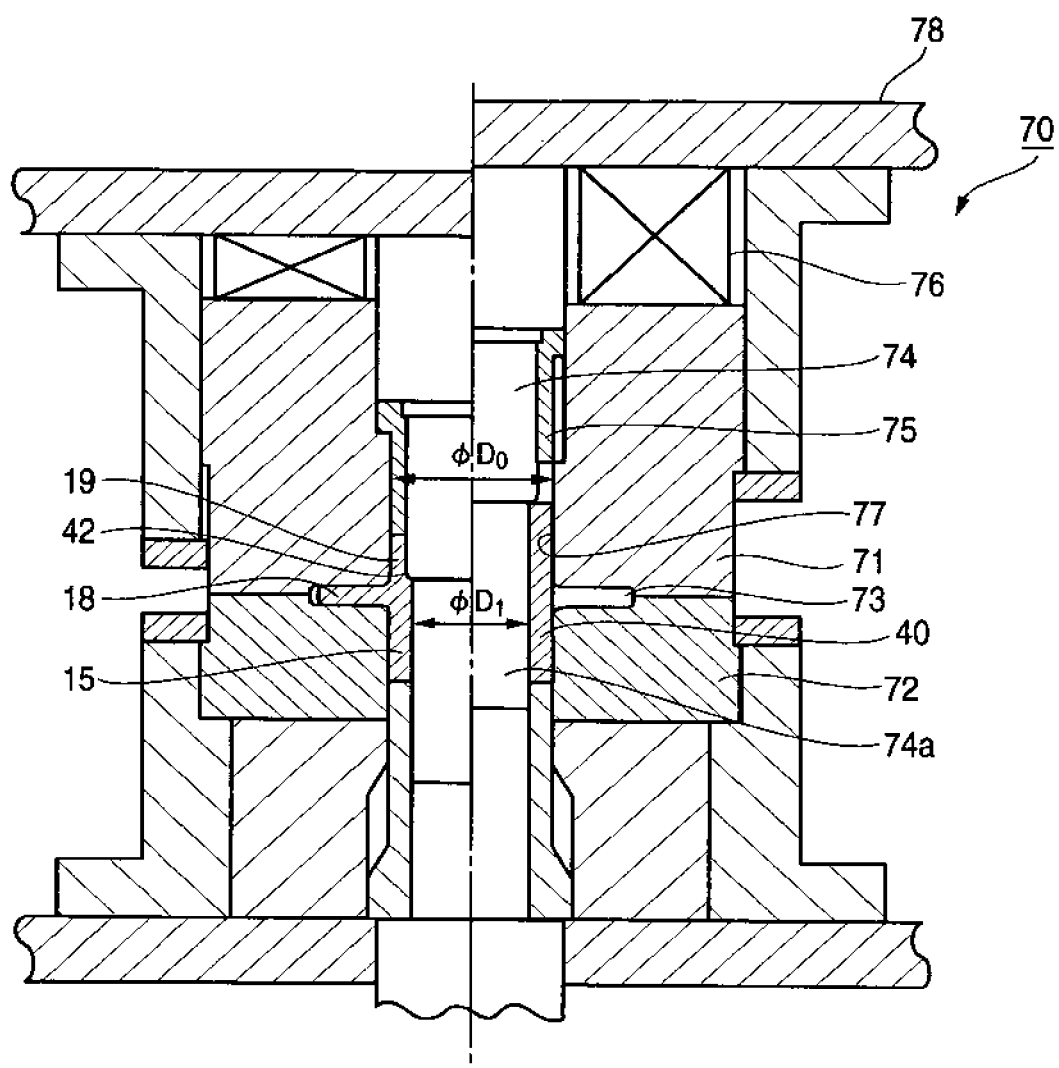
FIGS. 9A and 9B are sectional views for describing a sideway extrusion form for obtaining the outer ring.

FIG. 9 shows a form 70 used for a side extrusion process for obtaining the outer ring 3, wherein FIG. 9A shows a raw material inserting state, and FIG. 9B a forming state. This form 70 is provided with a lower die 72 into which an end portion on the outboard side of a shaft portion element 40 is inserted, and an upper die 71 adapted to be urged toward the lower die 72 by an elastic member 76. The upper die 71 is provided with a bore 77 the diameter of which is substantially equal to an outer diameter $\Phi D0$ of a positioning cylindrical portion 19, and an end portion of an inboard side of a shaft portion raw material 40 is placed in the bore 77. In the interior of the section of the bore 77 which is on the upper side of the end portion, a ring punch 75 and a punch 74 are provided slidably, and these punches are fixed to the upper form 78 to which the upper die 71 is secured via the elastic member 76. At a front end portion of the punch 74, a mandrel 74a the diameter of which is substantially equal to an inner diameter $\Phi D1$ of the shaft portion raw material 40 is provided so as to restrain the cylindrical shaft portion raw material 40. Between the end surfaces of the upper die 71 and lower die 72, radial grooves extending in the radially outward direction are provided. The radial grooves 73, may be formed in the upper die 71 alone or in the lower die 72 alone.

When the upper form 78 is lowered, the punch 74 forms first a stepped portion 42, which is opposed to an outer ring raceway surface 17, on an inner surface of an end portion on the shaft portion raw material 40. The ring punch 75 then contacts the inboard side end surface of the shaft portion raw material 40 and compresses the same in the axial direction (sideways). As a result, an outer circumferential portion of the shaft portion raw material 40 is extruded into the radial grooves 73 in the direction (sideways) which is at right angles to the direction in which the punch advances, and a suspension unit fixing flanges 18 are formed in one body with the shaft portion 15, an extrusion remaining portion of the diameter $\Phi D0$ occurring during the forming operation becoming a positioning cylindrical portion 19.

During this time, the forming load is imparted to the ring-shaped portion only of $\Phi D0$ to $\Phi D1$ of the shaft portion raw material, is not influenced by the length (surface area) of the suspension unit fixing flanges 18. Therefore, the suspension unit fixing flanges 18 having a large length (surface area) can be formed with an extremely small forming load as compared with the forming load in the case where such flanges 18 are compression formed. In order to carry out the fluidization of the raw material in a well-balanced manner in the radial grooves 73, the lower die 72 may be made vertically movable just as the upper die 71, and may be urged toward the upper die 71 via an elastic member (upper and lower die-floating structure).

Therefore, in this embodiment, the wheel fixing flanges 7 of the hub ring 6 are formed with the solid shaft portion 5 in one body by the cold side extrusion, and the suspension unit fixing flanges 18 of the outer ring 3 with the hollow shaft portion 15 in one body by the cold side extrusion. Therefore, even when the extrusion length (surface area) of the wheel fixing flanges 7 and suspension unit fixing flanges 18 becomes large, the forming load does not vary owing to the features of the extrusion forming. This enables the wheel fixing flanges 7 and suspension unit fixing flanges 18 to be formed with a low load by the cold forging using comparatively small equipment as compared with such flanges 7, 18 fixing flange 7 and suspension unit fixing flanges 18 compression formed.

The joint portion between the wheel fixing flanges 7 and the outer circumferential portion of the hub ring 6 and the joint portion between the suspension unit fixing flanges 18 and outer circumferential portion of the outer ring 3 are not subjected to a bending process. Therefore, a sufficient thickness of these joint portions can be secured, and the hub ring 6 and outer ring 3 of a sufficiently large strength can be obtained.

Since the wheel fixing flanges 7 and suspension unit fixing flanges 18 are sideway extrusion formed, the extrusion remaining portions can be used as the wheel positioning cylindrical portion 9 and vehicle body positioning cylindrical portion 19. This enables the circumferentially continuous cylindrical positioning portions 9, 19 to be cold formed with the shaft portions 5, 15 in one body easily with a high accuracy. Moreover, excess fixing portions, which are necessary when these positioning cylindrical portions 9, 19 are formed separately, become unnecessary, so that it becomes possible to improve the material yield with the thickness of the necessary portions secured, and thereby reduce the manufacturing cost.

The present invention is not limited to the above-described embodiment, and suitable modifications without departing from the gist of the invention can be made.

In this embodiment, the raceway ring member for the wheel support hub unit for the inner ring rotating driven wheel is shown. The present invention may, of course, be applied to the wheel support hub units for an inner ring rotating driving wheel, an outer ring rotating driven wheel, or an outer ring rotating driving wheel.

In this embodiment, a plurality of rows of rolling bearings, around which the outer ring 3 is fitted, are illustrated as the bearing portion thereof. The present invention may be applied to the raceway member of a wheel support hub unit employing a plurality of rows of rolling bearings the inner rings of which are divided at substantially an axially central portions thereof besides two rows of single-line angular ball bearings and two rows of single-line conical rolling bearings instead of the bearings illustrated above.

Further, the bearing ring member of a wheel support hub unit, and a method of manufacturing the same in each embodiment of the present invention will now be described in detail with reference to the drawings.

Second Embodiment

Figure 11:
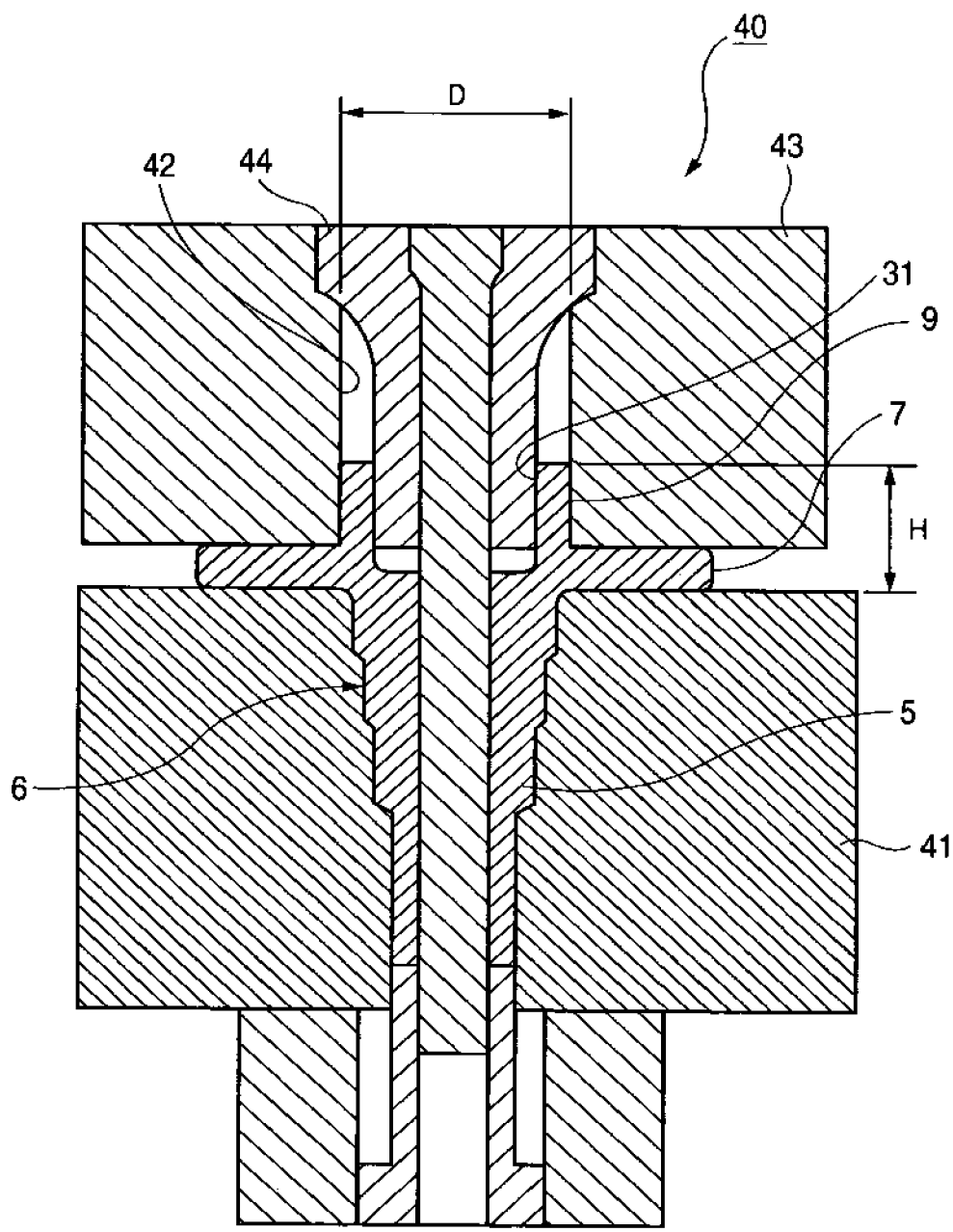
FIG. 11 is a sectional view showing an example of a upsetting form.

The hub ring 106 for a driving wheel, which is a bearing ring member of the wheel support hub unit 101 will be taken as an example, and a method of manufacturing the same will be described. First, as shown in FIG. 10A, a hollow cylindrical shaft portion raw material 130 is subjected to forward extrusion forming to form a shaft portion member 130a of FIG. 10B. A head portion of the shaft portion member 130a member is then upset to form a shaft portion member 130b shown in FIG. 10C. This shaft portion member 130b is subjected to a head portion rearward extrusion forming to form a head portion 132 having a stepped recess 131 forming the shapes of the inner circumferences of the shaft portion 105 and positioning cylindrical portion 109. The head portion 132 is then upset so that that the height of the wheel fixing flanges 107 remains by using the form 140 shown in FIG. 11, to form the wheel fixing flanges 107.

The form 140 is provided with a lower die 141 having an inner circumferential surface the diameter of which is substantially equal to that of the outer circumferential surface of the shaft portion 105, an upper die 143 having a bore 142 the diameter of which corresponds to that of an outer circumference D of the positioning cylindrical portion 109, and a radial deformation preventing guide member 144 engaged with the upper die 143 and engageable with the inner circumferential surface of the positioning cylindrical portion 109. When the head portion 132 is upset so as to have the height of the wheel fixing flanges 117 remain by the upper die 143 with the shaft portion 105 of the wheel fixing flanges 107 held by the lower die 141, the wheel fixing flanges 107 are formed.

In this form, the upper die 143 does not contact the part of the positioning cylindrical portion 109 which has a diameter smaller than that of the outer circumference D of the positioning cylindrical portion 109, and the outer part only of the positioning cylindrical portion 109 is upset. During such a upsetting operation, the height H of the head portion does not vary, so that the positioning cylindrical portion 109 is formed simultaneously with the wheel fixing flanges 107. Although the radial deformation preventing guide member 144 is fitted in the inner circumference of the recess 131 of the positioning cylindrical portion 109, the end surface of the guide member 144 is not brought into contact with a bottom surface of the positioning cylindrical portion 109.

The manufacturing method in this embodiment can also be applied when an outer ring and a hub ring for a driven wheel are manufactured.

Therefore, in this embodiment, a shaft portion 105 and a recess 131 are extrusion formed out of a hollow shaft portion raw material 130, and a head portion 132 is thereafter upset with the height of the wheel fixing flange 107 left thereon, by using the upper die 143 having a bore 142 the diameter of which corresponds to the outer circumference of the positioning cylindrical portion 109. As a result, during the upset-forming of the wheel fixing flanges 107 in which the processing load is the highest, the part of the positioning cylindrical portion 109 which is on the inner side of the outer circumference thereof is not necessary to be compressed. Therefore, as compared with a case where the wheel fixing flanges 107 as a whole are upset, the surface area to be upset decreases, so that the wheel fixing flanges 107 can be formed with a low load.

This enables the wheel fixing flanges 107 to be formed by the cold forging by using comparatively small equipment, and a cutting margin used in a later step decreases, so that inexpensive hub ring 106 and wheel support hub unit 101 can be obtained. Since a joint portion between the wheel fixing flanges 107 and the outer circumferential section of the shaft portion 105 is not subjected to a bending process, a sufficient thickness can be secured in the joint portion, and the hub ring 106 and wheel support hub unit 101 which have a sufficient strength can be obtained.

During the upsetting process, the inner circumferential side of the upper form 143 can be used to form the positioning cylindrical portion 109. Therefore, the circumferentially continuous cylindrical positioning portion 109 can be formed with the shaft portion 105 in one body easily with a high accuracy. Moreover, excess thickness for carrying out a necessary fixing operation becomes unnecessary when the positioning cylindrical portion 109 is formed separately, the material yield can be improved with the thickness of a necessary portion secured. This enables the manufacturing cost to be reduced.

Third Embodiment

A method of manufacturing a bearing ring member of a wheel support hub unit in a third embodiment of the present invention will now be described in detail with reference to FIG. 12 with the outer ring 103 for the driving wheel shown in FIG. 1 serving as a bearing ring member.

As shown in FIG. 12A, a hollow cylindrical shaft portion raw material 150 is subjected to the forward extrusion forming to form a shaft portion member 150a having a head portion 152 provided with a recess 151 forming an inner circumferential shape of a shaft portion 115 and positioning cylindrical portion 119 of FIG. 12B. As shown in FIG. 12C, a head portion 152 is then formed to a heteromorphous outer circumferential shape having radial projections 153 the number of which is equal to that of fixing holes 118a provided in a suspension unit fixing flanges 118. In the upsetting step of FIG. 12D, the head portion 152 is then upset with the shaft portion 115 held in the lower die (not shown) and with the head portion 152 left at the height of the suspension unit fixing flanges 118 without restraining an outer circumference, by using an upper die (not shown) having a bore the diameter of which corresponds to the outer circumference D of the positioning cylindrical portion 119 to form the suspension unit fixing flanges 118.

In this embodiment, the head portion 152, i.e. an intermediate element in the heteromorphous upsetting step is heteromorphous, so that the suspension unit fixing flanges 118 upset in the upsetting step is also heteromorphous with the upsetting surface area becoming required minimum. Therefore, a forming load becomes low, and the height H of the head portion 118 does not vary, so that the positioning cylindrical portion 119 is formed at the same time.

In a stepped portion forming step (thinning step) shown in FIG. 12E, interposed parts of circumferentially adjacent radial projections 142 are upset to smaller thickness to cause unnecessary parts of the suspension unit fixing flanges 118 to be formed as small thickness portions 154. As shown in FIG. 12F, an excess thickness portion is then removed by trimming, and an outer ring 103 is thus manufactured. Since the upsetting operation in the stepped portion forming step is applied to the small thickness portions 154, and the other portions are not compressed, so that the forming load can be reduced.

The manufacturing method in this embodiment can also be applied when a hub ring for a driving wheel, and a hub ring for a driven wheel are manufactured.

Accordingly, in this embodiment, the outer circumferential shape of the head portion 152 having the radial projections 153 is set heteromorphous in the heteromorphous head portion forming step, so that the outer circumference of the suspension unit fixing flanges 118 not yet upset can beset heteromorphous. As a result, the surface area of the portion to be upset decreases during the upsetting process enable the forming load to be held down to a low level. In order to upset the small thickness portions only of the suspension unit fixing flanges 118, the forming load can be held down to a low level since the outer circumference can be reduced after the circumference is upset. Moreover, since the quantity of trimming of the outer circumference decreases, the yield can be improved.

The other operation and effect are identical with the corresponding operation and effect of the above-described second embodiment, so that the description thereof in the third embodiment will be omitted.

Forth Embodiment

Figure 14B:
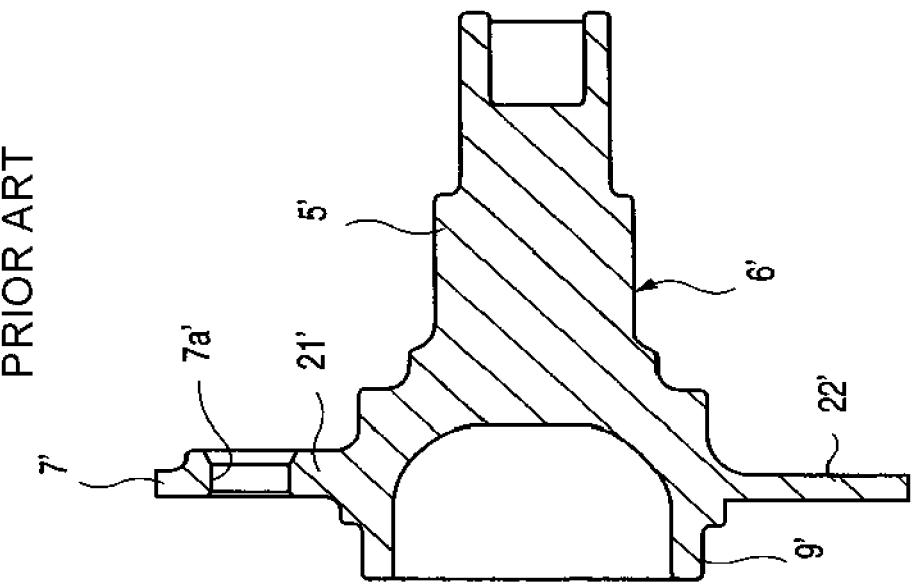
Figure 14A:
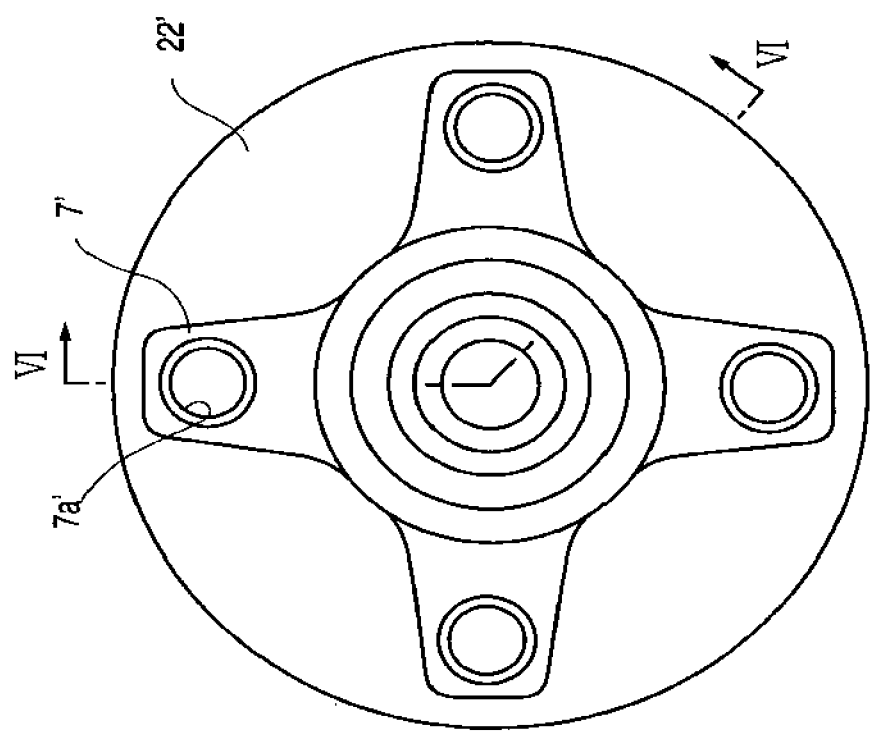
Figure 15A:
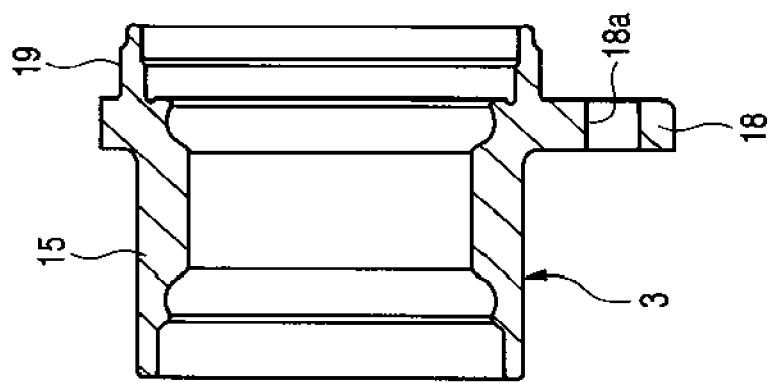
Figure 15B:
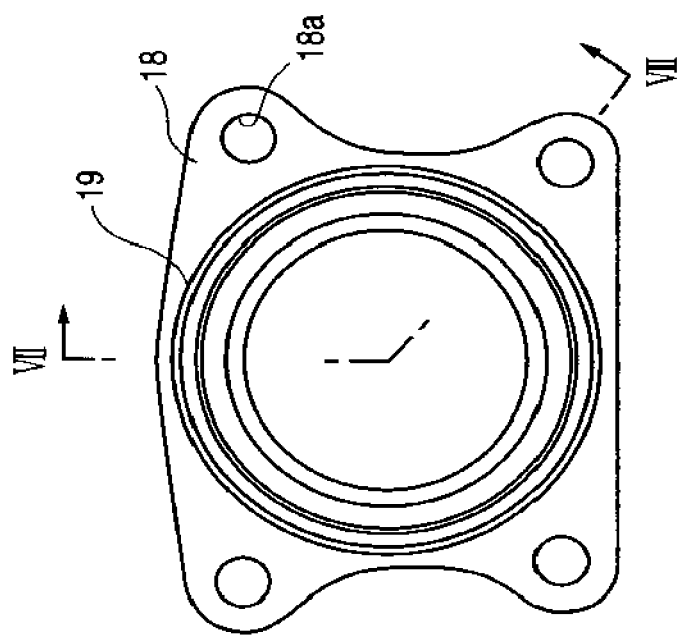
Figure 16B:
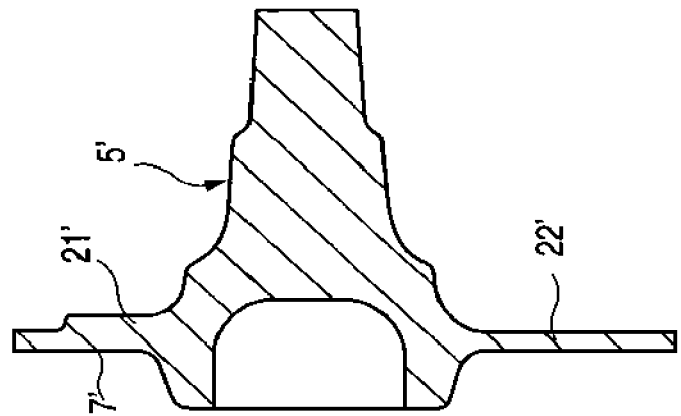
Figure 16A:
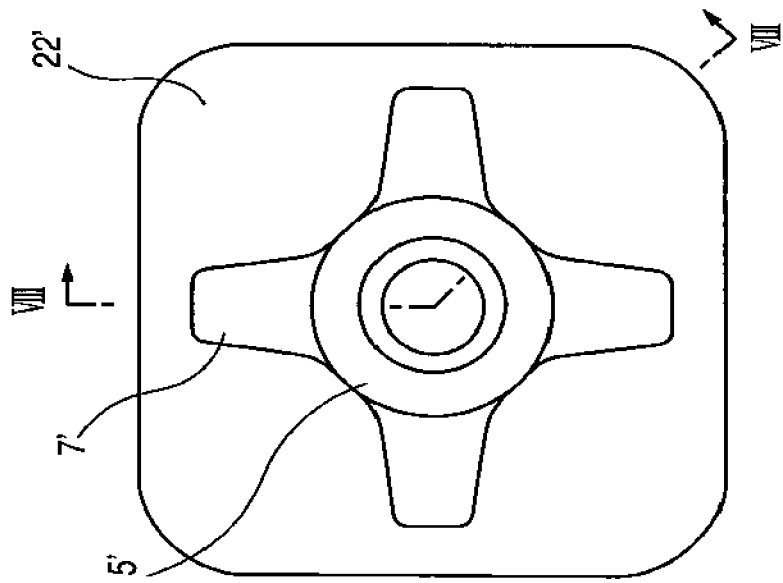
Figure 17B:
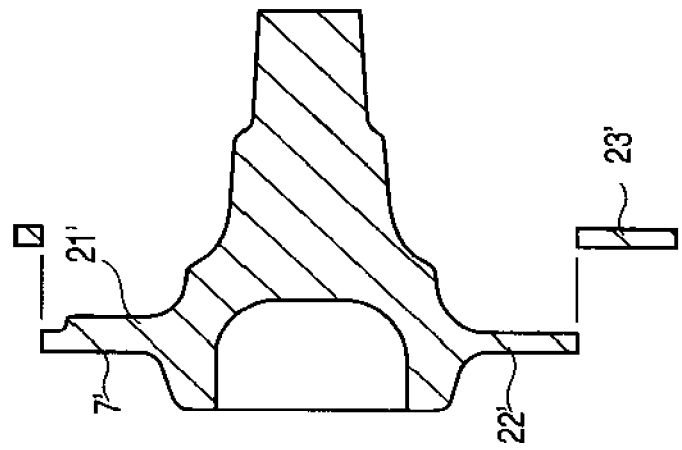
Figure 17A:
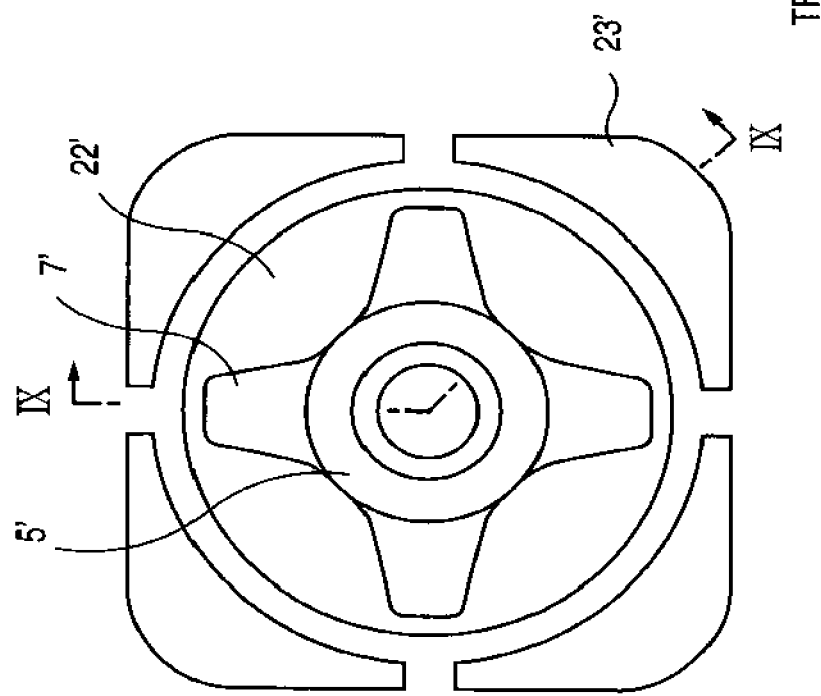

A method of manufacturing a bearing ring member of a wheel support hub unit in a forth embodiment of the present invention will now be described in detail with reference to FIG. 13 with a hub ring 106' for a driven wheel shown in FIG. 14 taken as an example of a bearing ring member.

First, a solid shaft portion raw material 160 shown in FIG. 13A is subjected to extrusion forming to form a shaft portion member 160a shown in FIG. 13B. A head portion of the shaft portion member 160a is then upset to form a shaft portion member 160b shown in FIG. 13C. The shaft portion member 160b is then subjected to ahead portion rearward extrusion forming as shown in FIG. 13D, to form a recess 161 which is to form an inner circumferential shape of a shaft portion 105' and positioning cylindrical portion 109'. When an inner circumference of a die (not shown) is set heteromorphous at the same time, the head portion 162 is formed as the outer circumference thereof is swelled to a heteromorphous shape. Thus, an outer circumferential shape having radial projections 163 the number of which is equal to that of fixing holes 107a' provided in wheel fixing flanges 107' is formed. The head portion 162 is then upset in accordance with a upsetting step of FIG. 13E with the height H of the wheel fixing flanges 107 left on the head portion 162 without restraining an outer circumference thereof with the shaft portion 105' held in a lower die (not shown), by using an upper die (not shown) having a bore of a circumferential length corresponds to an outer circumference D of the positioning cylindrical portion 109', and the wheel fixing flanges 107' are thereby formed.

During this time, the wheel fixing flanges 107' upset in the upsetting step also becomes heteromorphous since the head portion of an intermediate material in the head portion rearward extrusion step has a heteromorphous shape. As a result, the upsetting surface area comes to be at a required minimum level, so that a forming load becomes low. Since the height H does not vary, the positioning cylindrical portion 109' is formed at the same time.

In a stepped portion forming step (thinning step) shown in FIG. 13F, the portions among the circumferentially adjacent radial projections 163 are upset, and the thickness of unnecessary portions of the wheel fixing flanges 107' is thereby set smaller. Excess thickness portions are then removed by carrying out a trimming process shown in FIG. 13G to manufacture a hub ring 106'. The upsetting operation in the stepped portion forming step is applied to only the portions, which are to form smaller thickness portions, and the other portions are not compressed, so that the forming load can be lowered. When the unnecessary excess thickness portions are trimmed off in the trimming step, wheel fixing flanges 107' of different thickness and small thickness portions 122' are formed.

The manufacturing method in this embodiment can also be applied to cases where the outer ring and hub ring for a driving wheel are manufactured.

Therefore, in this embodiment, a head portion 162 having a shaft portion 105' and a recess 151 is formed in the head portion rearward extrusion step, in which the outer circumferential shape of the head portion 162 having radial projections 163 is at the same time set heteromorphous. The outer circumferential shape of the wheel fixing flanges 107' not yet upset is thereby set heteromorphous, so that the surface area of the part to be upset during a upsetting process decreases, a forming load being thereby rendered able to be held down to a low level. During the thinning step for upsetting only the small thickness portions 122' with respect to the wheel fixing flanges 107', the forming load can be held down to a low level since the outer circumference of the same flanges upset can be reduced. Furthermore, since the quantity to be trimmed of the outer circumference decreases, the yield can be improved.

Concerning the other operation and effect of this embodiment are identical with the corresponding operation and effect of the second embodiment, so that giving a description thereof will be omitted.

The present invention is not limited to these embodiments, but can be suitably modified within the scope not departing from the gist of the present invention.

In these embodiments, a plurality of rows of rolling bearings around an end portion of the hub ring 106 for which the outer ring 103 is fitted are shown as examples of bearing portions. The present invention may also be suitably applied to a bearing ring member of a wheel support hub unit employing a plurality of rows of rolling bearings in which an inner ring is divided into two at a substantially axially intermediate portion thereof in addition to a bearing ring member having two rows of single-row angular ball bearings or two rows of single-row conical rolling bearings instead of the rolling bearings shown as examples in the embodiments.

In the embodiments of the present invention, a driving wheel member of a wheel support hub unit for an inner ring rotating driving wheel, and a driving wheel member of a wheel support hub unit for an inner ring rotating driven wheel are shown as examples. The present invention may, of course, be applied to a bearing ring member of a wheel support hub unit for an outer ring rotating driven wheel or an outer ring rotating driving wheel.

FIG. 4

A1 ... RAW MATERIAL
A2 ... FORWARD EXTRUSION
A3 ... HEADING
A4 ... SIDEWAY EXTRUSION

FIG. 7

A1 ... RAW MATERIAL
A2 ... SIDEWAY EXTRUSION
A3 ... FORMATION OF STEPPED PORTIONS

FIG. 10

A1 ... RAW MATERIAL
A2 ... FORWARD EXTRUSION
A3 ... UPSETTING OF A HEAD PORTION
A4 ... REARWARD EXTRUSION OF THE HEAD PORTION
A5 ... UPSETTING OF FIXING PORTIONS

FIG. 12

A1 ... RAW MATERIAL
A2 ... FORWARD EXTRUSION
A3 ... HETEROMORPHOUS UPSETTING OF A HEAD PORTION
A4 ... UPSETTING OF FIXING PORTIONS
A5 ... FORMATION OF STEPPED PARTS ON THE FIXING PORTIONS
A6 ... TRIMMING

FIG. 13

A1 ... RAW MATERIAL
A2 ... FORWARD EXTRUSION
A3 ... UPSETTING OF A HEAD PORTION
A4 ... REARWARD EXTRUSION OF THE HEAD PORTION
A5 ... UPSETTING OF FIXING PORTIONS
A6 ... FORMATION STEPPED PORTIONS ON THE FIXING PORTIONS
A7 ... TRIMMING

FIG. 16

A1 ... HOT FORGING

FIG. 17

A1 ... TRIMMING

What is claimed is:

1. A method of manufacturing a bearing ring member of a wheel support hub unit of an automobile including a plurality of wheel or vehicle body fixing portions extending radially outward in a radiating shape from a solid or hollow shaft portion, and a wheel or vehicle body positioning cylinder provided concentrically with the shaft portion, each of the fixing portions provided with fixing holes and formed so that the fixing portions are not connected to one another along a pitch circle of the fixing holes, the method comprising:

placing a raw material, which is solid or hollow for forming the shaft portion, in a die having an axial portion and a plurality of independent grooves extending radially outward from the axial portion in a radiating shape, cold forging the raw material by compressing the raw material in the axial portion of the die with an axial load in an axial direction of the axial portion of the die such that a portion of the raw material flows into the grooves of the die to form the fixing portions unitarily and integrally with the shaft portion by cold side extrusion, wherein the grooves of the die and the fixing portions have at least two lateral walls which are substantially parallel to each other.

2. The method according to claim 1, wherein the portion of the raw material reaches a radial end of each of the grooves of the die after the shaft portion has been formed.

3. A method of manufacturing a bearing ring member of a wheel support hub unit of an automobile, the bearing ring member including a shaft portion, a plurality of independent fixing portions extending radially outward from the shaft portion in a radiating shape, and a wheel or vehicle body positioning cylinder provided concentrically with the shaft portion, the method comprising:

placing a shaft portion element in a die, the die having an axial portion and a plurality of independent grooves extending radially outward from the axial portion in a radiating shape, cold forging the shaft portion element by compressing the shaft portion element in the axial portion of the die with an axial load in an axial direction of the axial portion of the die such that a portion of the shaft portion element flows into the grooves of the die by cold side extrusion to form the fixing portions unitarily and integrally with the shaft portion, such that each of the fixing portions has substantially the same length in a radially extending direction.

4. The method according to claim 3, wherein each of the fixing portions has two lateral walls which are substantially parallel to each other.

5. The method according to claim 3, wherein the portion of the shaft portion element reaches a radial end of each of the grooves of the die after the shaft portion has been formed.

6. The method according to claim 3, wherein each of the fixing portions has two axially facing surfaces extending radially outward in a flat manner from a proximal portion of the fixing portion to a distal end of the fixing portion.

7. The method according to claim 3, wherein the fixing portions are arranged mirror-symmetrically with respect to at least two planes intersecting at a center axis of the shaft portion.

* * * * *